April 4, 1967  P. D. ABBOTT  3,312,290
CULTIVATOR HARNESS
Filed April 14, 1966  4 Sheets-Sheet 1
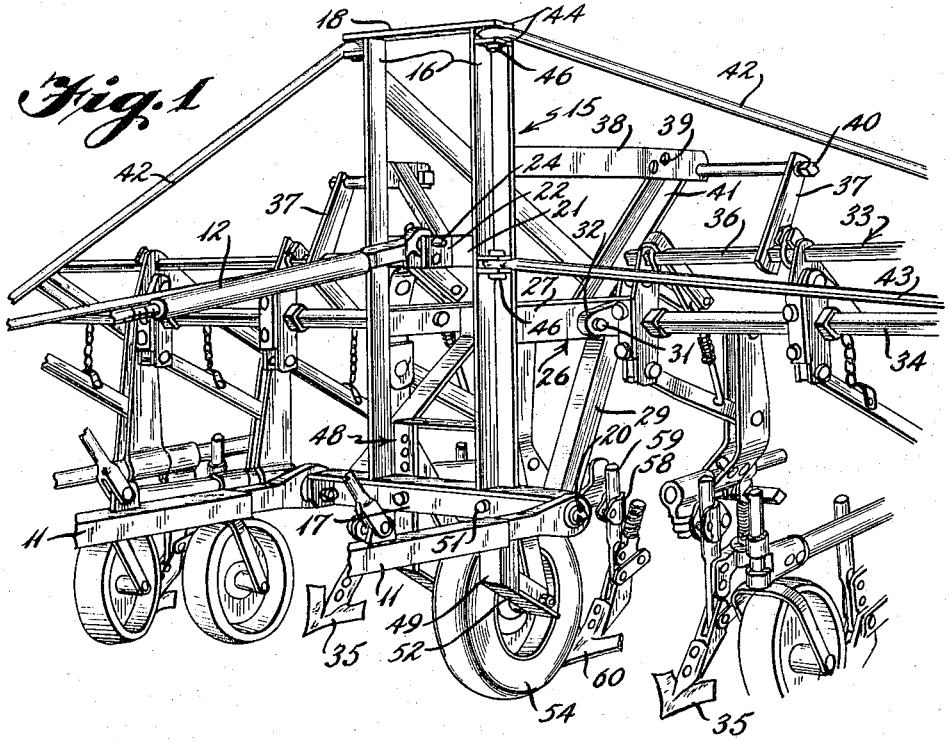
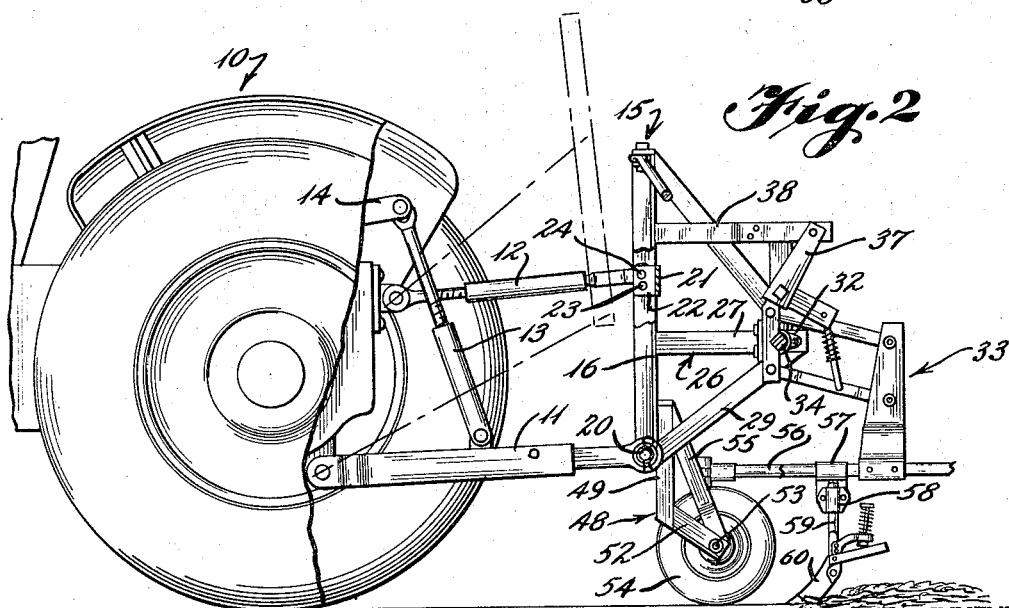
INVENTOR
PAUL D. ABBOTT
BY
ATTORNEYS

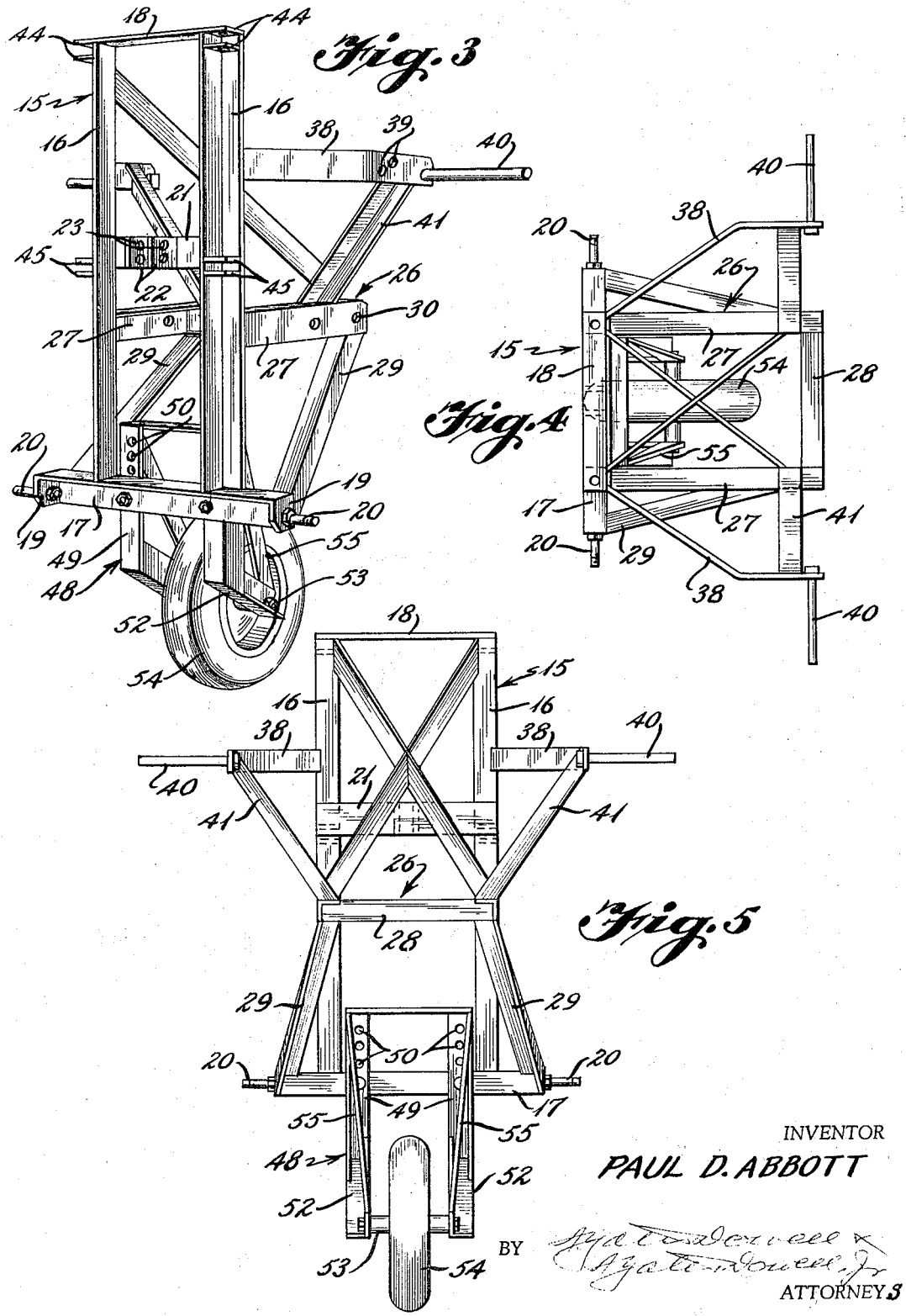

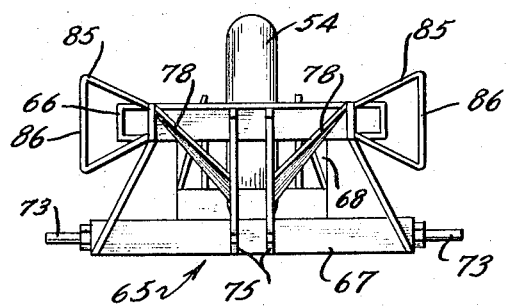
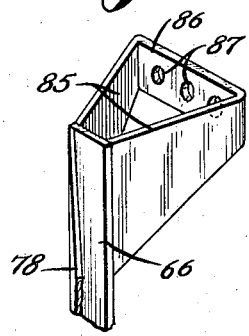
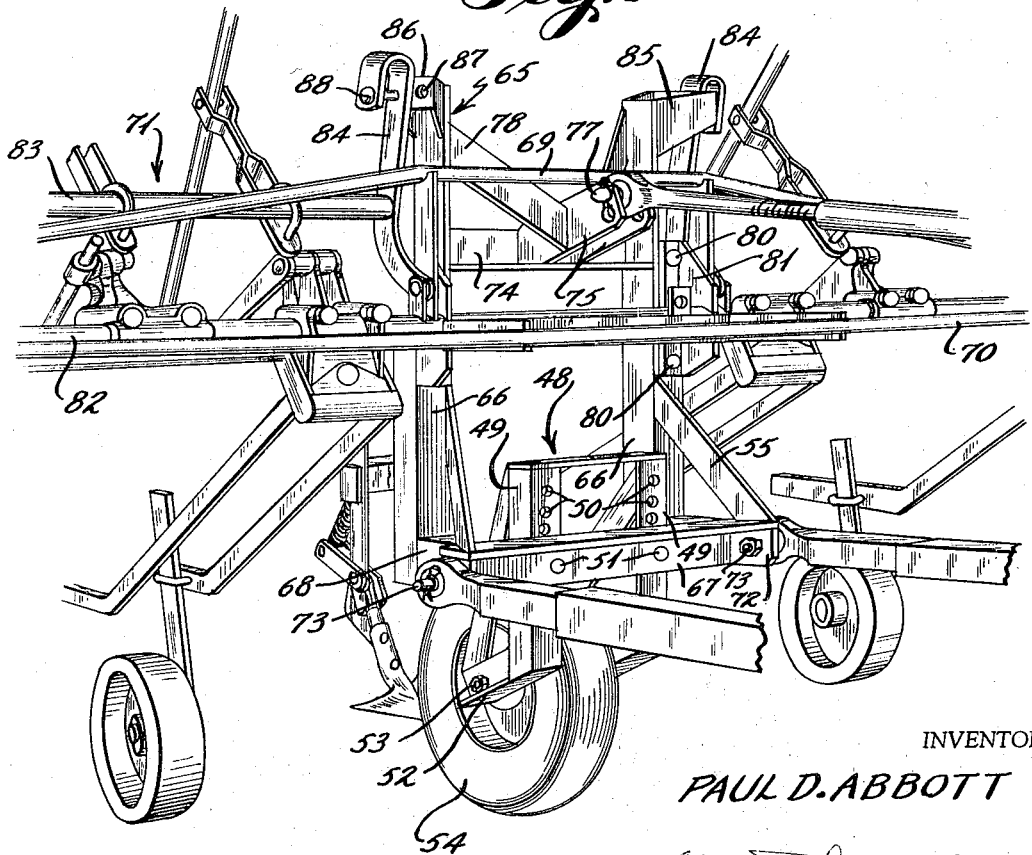

April 4, 1967 P. D. ABBOTT 3,312,290
CULTIVATOR HARNESS
Filed April 14, 1966 4 Sheets-Sheet 4

INVENTOR
PAUL D. ABBOTT
BY
ATTORNEYS

United States Patent Office 3,312,290
Patented Apr. 4, 1967

3,312,290
CULTIVATOR HARNESS
Paul D. Abbott, P.O. Box 187, Blytheville, Ark. 72315
Filed Apr. 14, 1966, Ser. No. 542,592
3 Claims. (Cl. 172—451)

ABSTRACT OF THE DISCLOSURE

An apparatus mounted on the three-point hitch at the rear of a tractor and adapted to receive earth-working implements which normally are mounted on the front of the tractor. Means is provided on the apparatus for locking the implements in operating position so that raising and lowering of the implements will be done by the hitch.

---

This invention relates to agricultural implements and particularly to apparatus for mounting a conventional front mounted implement on the three-point hitch at the rear of a propelling vehicle.

Heretofore many earth-working implements have been provided, some of which have been mounted on a hitch at the rear of a tractor and others have been mounted on the front of a tractor. The implements mounted on the hitch have been raised and lowered by the hitch controls, but the implements mounted on the front of the tractor have required special equipment to control the raising and lowering of such implements. The front mounted implements have required excessive time and labor to attach to and detach from the vehicle and have been difficult to raise and lower. Frequently the farmer has desired to mount the front mounted implements on the tractor hitch but has been unable to do so.

It is an object of the invention to provide a harness for attaching a front mounted implement to the rear hitch of a tractor in a minimum of time and with minimum effort.

Another object of the invention is to provide a harness having depth control means and one or more auxiliary cultivators located directly behind the tractor to insure complete cultivation.

Figure 7:
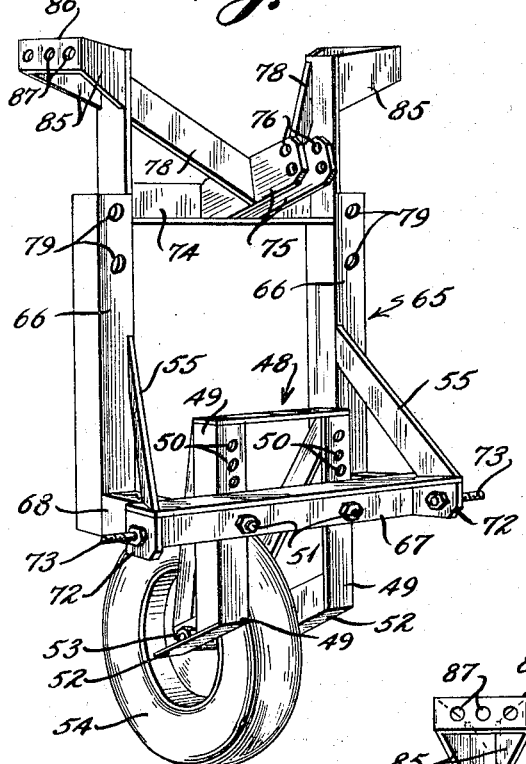
Figure 8:
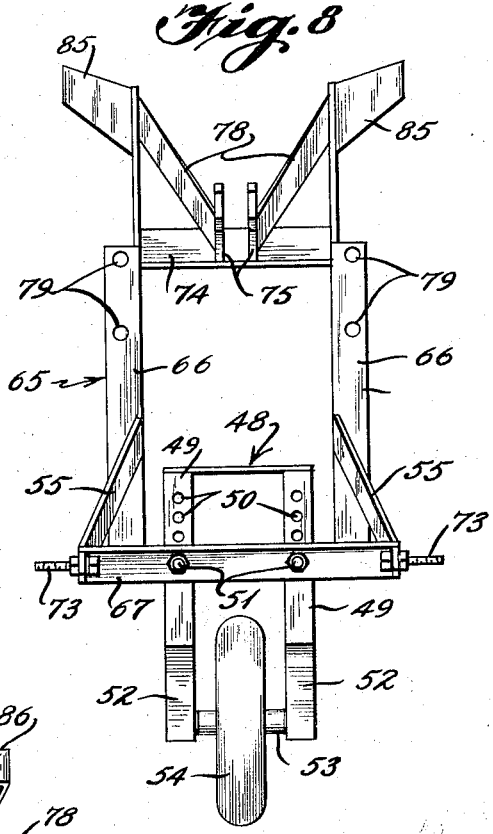
Figure 9:
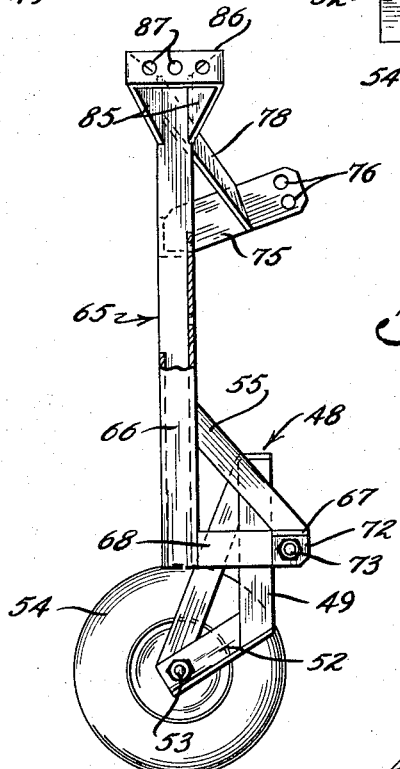

Other objects and advantages of the invention will be apparent from the following description taken in conjunction with the accompanying drawings in which:

FIG. 1 is a perspective illustrating one application of the invention;
FIG. 2, a side elevation thereof;
FIG. 3, a perspective of the harness per se;
FIG. 4, a top plan view thereof;
FIG. 5, a rear elevation;
FIG. 6, a perspective of a modified form of the invention in use;
FIG. 7, a front perspective of the harness per se of the modification of FIG. 6;
FIG. 8, a front elevation thereof;
FIG. 9, a side elevation;
FIG. 10, a top plan view; and,
FIG. 11, an enlarged detail perspective of a portion of the implement connecting means.

With continued reference to the drawings, a tractor 10 is provided having a pair of draft arms 11 and an adjustable link 12 forming a three-point hitch. The draft arms 11 are connected by links 13 to lift arms 14 to raise and lower the draft arms in a conventional manner.

Certain manufacturers of farm equipment manufacture implements which extend entirely across the front of the tractor and outwardly a distance sufficient to span several rows on each side thereof, while other manufacturers make implements which are attached to each side of the tractor adjacent to the front and such implements extend outwardly to span several rows. The modification illustrated in FIGS. 1–5 is a harness 15 adapted to accommodate a split or two-piece implement or an implement that is designed to be attached to opposite sides of the tractor.

The harness 15 includes a frame having a pair of spaced generally parallel upright members 16 connected at their lower ends by a cross brace 17 and at their upper ends by a spreader 18. The cross brace 17 is provided with a forwardly extending lug 19 at each end and each of such lugs is provided with a connecting pin 20 which receive the free ends of the draft arms 11. A cross member 21 extends between the upright members 16 intermediate the ends thereof, and such cross member is provided with a pair of forwardly extending lugs 22 having one or more openings 23 for the reception of a connecting pin 24 so that the adjustable link 12, which forms the third point of a three-point hitch, can be connected to the harness 15.

A rearwardly extending frame 26 is connected to the upright members 16 and such frame includes a pair of generally parallel side members 27 connected at their outer ends by an end member 28. The side members 27 are welded or otherwise attached to the upright members 16 and extend outwardly substantially at right angles in a position generally parallel with the ground. If desired a brace 29 can be provided which extends from the cross brace 17 upwardly to the side members 27 to provide the necessary strength and rigidity to the frame 26.

The side members 27 are provided with openings 30 for the reception of bolts or other fasteners 31 by which the mounting plate 32 of a cultivator or other implement 33 can be connected to the frame 26. The implement 33 normally has a tool bar 34 on which cultivator plows 35 or other earth-working tools may be mounted and such plows are normally raised and lowered by an actuating bar 36 controlled by an operating lever 37. In order to lock the implements in fixed position so that the raising and lowering is done by the tractor hitch, an outwardly and rearwardly extending arm 38 is connected to each of the upright members 16 and each arm may have one or more openings 39 for the reception of a bolt or other fastener 40 by which the lever 37 is connected to the arm 39 in fixed relation. Each arm 38 is supported by a brace 41 extending upwardly from the frame 26 to maintain the implement in fixed position with any raising or lowering of the implement controlled by the tractor hitch.

The outer ends of the implements are supported by upper and lower stays 42 and 43, respectively. In order to connect the inner ends of the stays 42 and 43 to the harness 15, each of the upright members 16 is provided with a pair of upper lugs 44 and a pair of intermediate lugs 45 with each pair of lugs having an opening for the reception of a bolt or pin 46 which passes through the stays 42 and 43 to connect the stays to the harness.

In order to control the depth of penetration of the implement the harness 16 is provided with an auxiliary frame 48 including a pair of generally upright members 49 each of which has a plurality of openings 50 for receiving bolts or other fasteners 51 carried by the cross brace 17 to attach the auxiliary frame 48 to the harness. At the lower end of each of the upright members 49 is attached a downwardly and rearwardly extending support member 52 which carries an axle 53 adjacent to the lower end and such axle rotatably supports a ground-engaging wheel 54. If desired a brace 55 may extend downwardly from the upper portion of the upright members 49 to the outer end of the support members 52.

The auxiliary frame 48 may have one or more rearwardly extending shafts 56 each of which has a block 57 slidably mounted thereon and each block has a sleeve 58 in which the standard 59 of a conventional plow 60 is slidably attached. The plows 60 are adapted to cultivate the earth in the area directly behind the tractor to insure complete cultivation throughout the entire width of the row. The depth of penetration of the plows 60 is controlled by the position of the standard 59 within the sleeve 58 as well as the position of the auxiliary frame 48 relative to the harness 15.

In the operation of this modification, the mounting plates 32 of the split or two-piece implement 33 are mounted on the side members 27, and the stays 42 and 43 are secured to the lugs 44 and 45 after which the levers 37 are connected to the arms 38 by the bolts 40 so that the earth-working tools carried by the implement will remain in fixed position. Thereafter it is necessary only to connect the draft arms 11 of the tractor to the connecting pins 20 and to connect the adjustable link 12 to the lugs 22 by the connecting pin 24. The implement and harness can then be raised by the lift arms 14 and transported to a field where the work is to be done, after which the implement and harness are lowered until the plows 35 penetrate the earth to a depth controlled by the wheel 54 and the depth gauges carried by the implement.

With reference to FIGS. 6–11 a modified form of the device is illustrated for use with an implement which is designed to extend entirely across the front of the tractor so that such implement can be mounted on the hitch at the rear of such tractor. This modified form includes a harness 65 having a pair of spaced parallel generally upright members 66 connected at their lower ends by a cross member 67. If desired the cross member 67 may be offset laterally from the upright members 66 by spacers 68 so that the upper and lower stays 69 and 70, respectively, of an implement 71 will clear the rear wheels of the tractor when such implement is raised and lowered.

As illustrated the cross member 67 is provided with forwardly extending lugs 72 at opposite ends and each of such lugs is provided with a connecting pin 73 by means of which the draft arms 11 are connected to the harness 65. A cross member 74 connects the upright members 66 intermediate their ends and such cross member has a pair of forwardly extending lugs 75 each of which has one or more openings 76 for the reception of a connecting pin 77 by which the adjustable link 12, which forms the third point of the three-point hitch, can be connected to the harness 65. If desired, a brace 78 extends downwardly from each upright member 66 to the lugs 75 to form a rigid connection. The cross member 67 is provided with openings for the reception of bolts 51 so that an auxiliary frame 48, which has been previously described, can be mounted on the harness 65.

In order to mount the implement 71 on the harness 65 each of the upright members 66 is provided with openings 79 for the reception of bolts or other fasteners 80 by which a pair of mounting brackets 81 carried by the implement are attached to the harness 65. The implement 71 includes a tool bar 82 fixed to the mounting brackets 81 and such tool bar supports a plurality of plows or other tools which normally are adapted to be raised and lowered by an actuating bar 83 controlled by a lever 84. To connect the lever 84 to the harness 65 so that any raising and lowering of the implement will be done by the tractor hitch, a pair of outwardly diverging support members 85 are welded or otherwise attached to the upper end of each of the upright members 66, and such support members are connected at their outer ends by an attaching member 86 having one or more openings 87 for the reception of a connecting pin 88 which connects the lever 84 to the attaching member 86 in fixed position.

In the operation of this modification the mounting brackets 81 of the implement 71 are attached to the upright members 66, the operating lever 84 is connected to the attaching member 86 in any desired position, and the auxiliary frame 48 is connected to the cross member 67 in any desired position. Thereafter the draft arms 11 are connected to the connecting pins 73 carried by the cross member 67, and the adjustable link 12 is connected to the lugs 75 so that the implement 71 can be raised and lowered as desired.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A harness for mounting a front mounted tool bar having an earth-working implement thereon with an operating lever on a vehicle three-point hitch having a pair of draft arms and an upper link, said harness comprising a main frame including a pair of upright generally parallel members, a pair of vertically spaced cross members connecting said upright members, connecting pin means mounted on one of said cross members and providing attaching means for said draft arms, means carried by said other cross member providing a connection for the upper link, means for removably mounting at least one tool bar having earth working implements on said main frame, means on said main frame for securing said operating lever in fixed operating position, an auxiliary frame adjustably mounted on said main frame, and gauge wheel means carried by said auxiliary frame for controlling the position of said main frame when the implement is in operating position, whereby a normally front mounted implement can be mounted on a tractor hitch at the rear of the tractor and the hitch can raise and lower the implement.

2. The structure of claim 1 in which said means on said harness for securing the operating lever of said implement includes a rearwardly extending arm fixed to each of said upright members.

3. The structure of claim 1 in which said means on said harness for securing the operating lever of said implement includes at least one support member and attaching member connected to each of said upright members.

References Cited by the Examiner

UNITED STATES PATENTS

| 656,347 | 8/1900 | Flanders | 172—415 |
| 2,444,321 | 6/1948 | Wooldridge | 172—27 |
| 2,695,577 | 11/1954 | Webster | 172—276 X |
| 2,962,104 | 11/1960 | Antici | 172—307 X |
| 3,145,781 | 8/1964 | Rogler | 172—276 |
| 3,194,586 | 7/1965 | Noble | 280—461 |

FOREIGN PATENTS

| 1,073,132 | 9/1954 | France. |
| 780,863 | 8/1957 | Great Britain. |

ABRAHAM G. STONE, *Primary Examiner.*

J. R. OAKS, *Assistant Examiner.*